(12) United States Patent
Simon et al.

(10) Patent No.: US 6,447,674 B1
(45) Date of Patent: Sep. 10, 2002

(54) GRAVITY FLOW SLUDGE LOAD-OUT SYSTEM

(75) Inventors: Richard D. Simon; Richard H. Wilson, both of San Rafael, CA (US)

(73) Assignee: Material Systems Engineers, San Rafael, CA (US)

( * ) Notice: Subject to any disclaimer, the term of this patent is extended or adjusted under 35 U.S.C. 154(b) by 0 days.

(21) Appl. No.: 09/642,249

(22) Filed: Aug. 17, 2000

(51) Int. Cl.$^7$ ................................................ G01G 13/18
(52) U.S. Cl. .................... 210/104; 210/512.1; 700/240; 177/105; 52/194; 52/197; 222/56; 222/57; 222/129; 222/64
(58) Field of Search ................................. 177/105, 145, 177/148, 149; 52/194, 197; 251/326; 222/55, 64, 505, 77, 56, 129, 57; 210/104, 103, 512.1; 700/240

(56) References Cited

U.S. PATENT DOCUMENTS

| | | | | |
|---|---|---|---|---|
| 2,997,205 A | * | 8/1961 | Schuerger et al. | |
| 3,844,945 A | * | 10/1974 | Ciaffone | ...................... 210/104 |
| 3,959,636 A | * | 5/1976 | Johnson et al. | |
| 4,029,163 A | * | 6/1977 | Allen | |
| 4,401,174 A | * | 8/1983 | Nemechek | |
| 4,580,698 A | * | 4/1986 | Ladt et al. | |

* cited by examiner

*Primary Examiner*—Joseph W. Drodge
*Assistant Examiner*—Terry K. Cecil
(74) *Attorney, Agent, or Firm*—Larry D. Johnson; Craig M. Stainbrook; Johnson & Stainbrook, LLP

(57) ABSTRACT

A gravity flow sludge load-out system for rapid and accurate loading-out of large volumes of treated biosolids from a wastewater dewatering plant, said system includes a plurality of hoppers 12, 14 supported by a main structure 16 having a plurality of vertical support members 20, each resting on a load cell 28, a sludge inlet at the tip of each hopper, and hydraulically controlled metering gates 40 at the bottom. A PLC 70 controls delivery of sludge from a dewatering facility, including e.g. a dewatering centrifuge 56, into the hoppers and then controls load-out of the sludge to a container truck by providing real-time monitoring of net sludge load-out and tight control of metering gates.

9 Claims, 2 Drawing Sheets

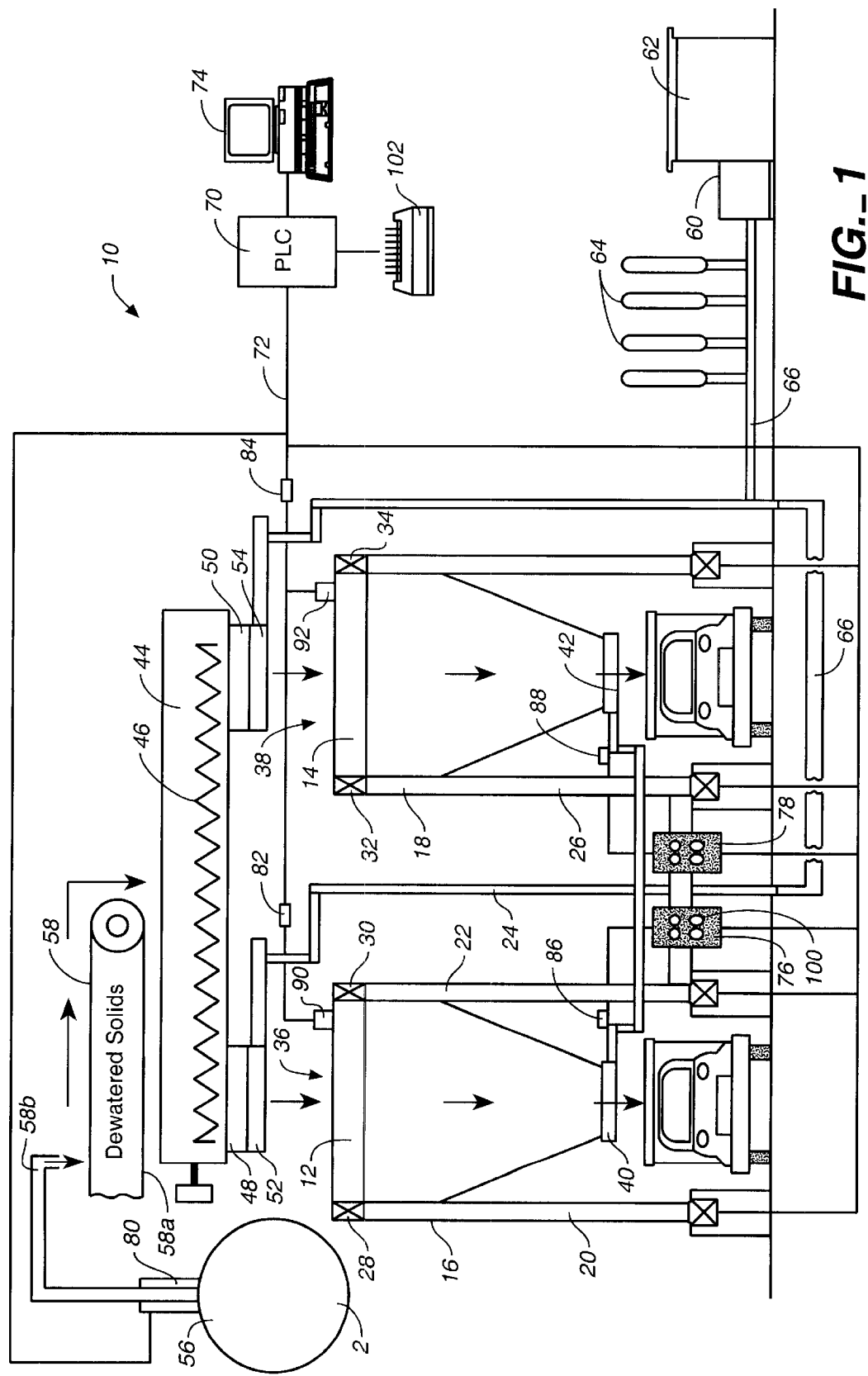
FIG._1

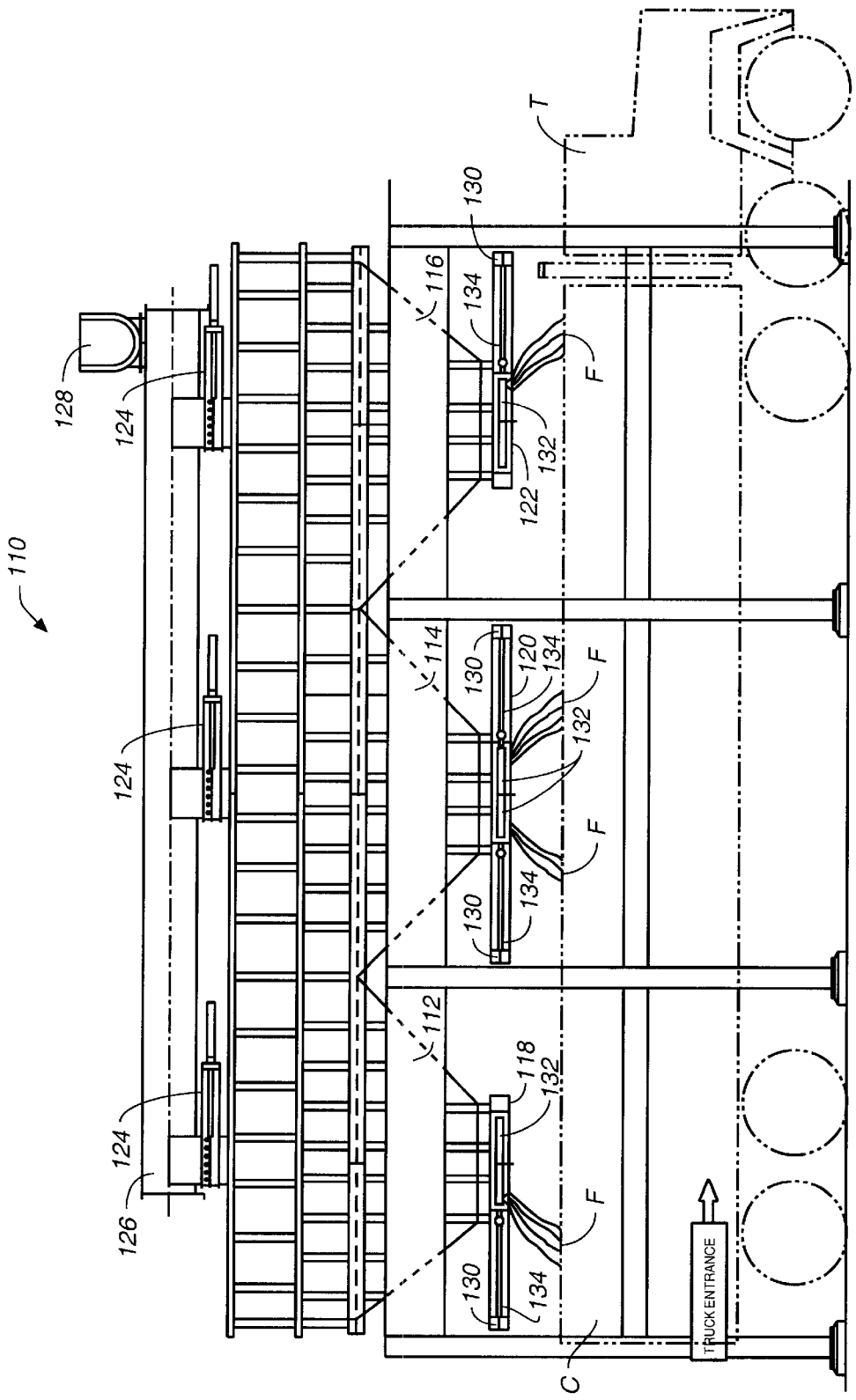
FIG._2

GRAVITY FLOW SLUDGE LOAD-OUT SYSTEM

BACKGROUND OF THE INVENTION

CROSS REFERENCE TO RELATED APPLICATIONS

Not applicable.

1. Field of the Invention

The present invention relates generally to systems for loading out large volumes of dewatered biosolids for transport, reuse, and disposal, and more particularly to a gravity flow sludge load-out system for rapid and highly controlled automated loading out of biosolids into container trucks.

2 Discussion of Related Art

The treatment and disposal of large volumes of sewage sludge has been a problem for many years. Numerous methods have been devised to render biological sludge generally pathogen free and suitable for reuse as soil amendment and fertilizer; and numerous other methods have been devised to make unusable sludge easier to transport for disposal. However, regardless of its ultimate destiny, treated sludge is typically stored briefly at a sewage treatment facility and then loaded out into containers for transport either to sludge customers or to disposal sites. And in facilities with high wastewater throughput, the sludge must be loaded out quickly and efficiently to avoid the accumulation of a large sludge inventory.

Furthermore, in the case of large municipalities, it is not uncommon for fertilizer plant sludge customers to demand a supply of several hundred thousand pounds of sludge each day. The logistics and mechanics of providing such an ongoing supply demands, firstly, that the system loads sludge quickly, not only to meet the demand for supply, but also to minimize time wasted by trucking and other transportation concerns; and, secondly, the system must load out the sludge with a high degree of accuracy, because municipalities must accurately track charges for the supply and must further maintain certified records pertaining to the disposition of specific amounts of hazardous waste. For billing purposes alone, the tolerances must typically be within ±1%. However, providing this degree of accuracy while simultaneously providing high throughput has not been achieved by prior art known to the present time. The source of the problem lies in large fluctuations in sludge flow rates, due, in turn, to large fluctuations in sludge viscosity caused by batch variants in sludge dehydration and temperature, and varying material heights or head pressures in the loading hoppers.

Another challenge in designing a sludge load-out system that provides rapid and accurate loading out is to provide a system capable of measuring real-time load-out status. Such a system feature is not merely desirable but mandatory at facilities where truck scales will not or can not be provided to measure loading status. Moreover, it is desirable to provide a variable load-out orifice to permit fine control of the sludge flow so as to minimize splattering and sludge loss; however, with such an orifice, flow meters cannot provide an accurate measurement of real-time flow. Finally, a system including real time sludge flow monitoring has not been devised in those systems in which hoppers are refilled while dispensing their content.

Accordingly, it is an object of the present invention to provide an automatic sludge loadout system that loads-out large volumes of sludge quickly and accurately.

It is a further object of the present invention to provide a sludge load-out system that measures real-time load-out status while also providing simultaneous load-out and hopper refilling.

It is yet another object of the present invention to provide a sludge load-out system that includes hoppers having variable load-out gate orifices.

SUMMARY OF THE INVENTION

The gravity flow sludge load-out system of the present invention provides a means for rapidly and accurately loading-out large volumes of treated biosolids from a wastewater dewatering plant. The system comprises at least one hopper, each supported by a main structure having a plurality of vertical support members. Each hopper rests on dedicated load cells. Each hopper has at least one inlet at the top for the introduction of sludge from the dewatering facility. Each hopper further includes a powered metering gate at the bottom, each including power means on each side, support rollers to support the gate blade, position sensors to establish the position of the blade during the load-out process, and proximity/limit switches to confirm fully opened and closed gate positions. The power means are preferably hydraulic, pneumatic, or electric cylinders having pistons connected to the metering gate blade.

Immediately above the hoppers is a sludge distribution container having a motorized distribution screw and outlets above each hopper. Interposed between the sludge distribution container outlets and the hopper are hydraulically controlled slide gates. Dewatered solids are conveyed from the dewatering facility centrifuges to the sludge distribution container via a conveyor system or pumped via pipes.

Movement of the mechanical components of the gate system, i.e., the slide gates and the metering gates, is powered by a power system, preferably hydraulic or pneumatic. The hydraulic power unit comprises a pump, a fluid reservoir, and at least one accumulator. The power unit is operatively connected to the slide and metering gates by a series of hydraulic lines. A comparable pneumatic power unit comprises a pump and accumulator.

To monitor load-out status and control load-out function, the system includes a control panel comprising a programmable logic controller (PLC), connected to a personal computer, at least one operator interface stations, the load cells, and, optionally, a dewatering facility magnetic flow meter. The PLC is also coupled to valve panels for each slide gate and each metering gate to selectively position or stabilize the gate blade.

BRIEF DESCRIPTION OF THE DRAWINGS

FIG. 1 is a front elevation schematic view of the preferred embodiment the gravity flow sludge load-out system of the present invention; and FIG. 2 is a side elevation view of a three-bay load out station in operation.

DETAILED DESCRIPTION OF A PREFERRED EMBODIMENT

FIG. 1 is a front elevation schematic view of the gravity flow sludge-load out system 10 of the present invention. This view shows that the system comprises at least one hopper. The system shown is a dual station system including a first hopper 12, and a second hopper 14, each with a large storage capacity, preferably at least 150 cubic yards, and each supported by a main structure 16 and 18. The support structures comprise a plurality of vertical support members 20, 22, 24, and 26. Each hopper rests on a dedicated load cell, 28, 30, 32, and 34. Alternatively, the support members may be support on load cells, though it is preferable for the hoppers alone to rest on the cells.

Each hopper has at least one inlet at the top, 36 and 38, respectively, for the introduction of sludge from the dewatering facility. Each hopper further includes a hydraulically controlled metering gate at the bottom, 40 and 42, respectively. A metering gate suitable for use in the system shown in FIG. 1, both as a slide gate and as a metering gate, is described in detail in U.S. Pat. application Ser. No. 09/642, 245 filed concurrently with the instant application, and entitled, Gravity Flow Sludge Metering Gate, incorporated herein by reference. As set out in that application, the metering gates are powered, preferably by at least one hydraulic, pneumatic, or electric, cylinder on at least one side. Rollers are used to support the gate blade and position sensors are used to establish the position of the blade during the load-out process.

Immediately above the hoppers is a sludge distribution container 44 having a motorized distribution screw 46, a first outlet 48 above the first hopper, and a second outlet 50 above the second hopper. Interposed between the first outlet and the first hopper is a first powered slide gate, or conveyor shut-off gate 52, and between the second outlet and second hopper a second powered conveyor shut-off gate 54. Dewatered solids are conveyed from the dewatering facility centrifuges 56 to the sludge distribution container via a conveyor system 58.

When a hydraulic system, for example, is employed, movement of the mechanical components of the gate system, i.e., the shut off gates and the metering gates, is powered by a hydraulic power unit comprising a pump 60, fluid reservoir 62, and an accumulator bank having at least one accumulator 64. The power unit is operatively connected to the shut-off and metering gates by a series of hydraulic lines 66. When a gate is opened or closed, the accumulator provides hydraulic pressure to the hydraulic cylinders to actuate gate blade movement. When the stored energy drops below a specified pressure, the pump automatically charges the accumulators. As dictated by load-out needs, the gates may be opened completely, closed completely, or held in an intermediate position, as is well known in the art. A functionally comparable pneumatic or electric power system may be substituted for the above-described hydraulic system without affecting the overall system characteristics.

To monitor load-out status and control load-out function, the system further includes a control panel comprising a programmable logic controller (PLC) 70, connected via data communication signal lines 72 with a personal computer 74, operator interface stations 76 and 78, at least one dewatering facility magnetic flow meter 80, and each load cell. The PLC is also connected to valve panels 82, 84, 86, and 88, for each shut-off gate and each metering gate to selectively position or stabilize the gate blade, and further to sludge level sensors 90 and 92, which convey data to the PLC regarding the static or dynamic height of sludge in the hopper.

Preliminary to load-out, treated sewage is partially dewatered by a treatment plant's centrifuge system 56. The sludge may be passed through which provides sludge flow amounts to the PLC, and then onto a conveyor 58*a*. Alternatively, the sludge may be loaded directly into the distribution container 44 via sludge transfer pipe 58*b*. The solids are then distributed within the distribution container to the hoppers and the hoppers are filled in preparation for load out.

In automatic mode the load-out operator uses a touchpad or key pad at the operator interface station to input truck and customer identification information and intended load weights. The touchpad transmits this data to the PLC where it is integrated to effect metering gate operation. On initiation of the load-out cycle from the PLC, the metering gate moves to its full open ("course") position and initiates sludge flow. When approximately 70% of the desired load is reached (in most instances approximately 35,000 lb in approximately two minutes), the PLC moves the gate to an intermediate position until 95% of load-out is reached. The gate then closes to the "fine" position until 100% of the load-out weight (approximately 50,000 lb) has been completed. The PLC then closes the gate completely, terminating load-out.

The PLC determines gate positioning as a function of the current weight of sludge loaded to the truck. This real-time loaded-out weight is calculated from hopper weight measurements and sludge flow into hoppers. These two measurements are scanned by the PLC every second to maintain an accurate accounting of sludge loaded into the truck.

When the operator initiates the load-out sequence, the PLC takes a snapshot of the hopper weight at the beginning of the sequence (i.e., hopper tare weight). The current total hopper weight is continuously monitored as sludge is loaded into the trucks. The net weight loaded into any truck at any given time is the initial hopper (tare) weight minus the current hopper weight, plus the total sludge flow into the hopper from the centrifuges calculated from the beginning of the load-out sequence. The optional magnetic flow meter at the centrifuge provides sludge-flow amounts to the PLC, though this information is additive and is not required for highly accurate load-out.

Tare and current hopper weights are measured by load cells 28 through 34. The gross weight measurement of the hoppers is accurate to 0.1% of span (0–75,000 lb). The weight measurement system subtracts the hopper tare weight from the actual hopper weight to determine the net sludge weight in the hopper at any time.

The loaded-out net weight is then used by the PLC for execution of its three primary control functions: (1) automatic sludge load-out from the loading hoppers; (2) automatic refilling of the hoppers; and (3) transmission of transaction data for accounting purposes.

The PLC tracks and controls hopper refilling by using hopper net weight status to modulate sludge transfer from the centrifugal dehydrators to the loading hoppers via the slide gates. The hoppers are filled to a predetermined differential weight as compared to one another. The hopper with the lowest weight is refilled first. When that hopper's net sludge weight exceeds the differential, as compared to the previous highest hopper weight, the filling sequence is redirected to the new lowest weight hopper and the cycle continues until all hoppers are filled. In this fashion, a multi-station, multi-hopper system can be tightly controlled so that several container trucks be serviced simultaneously, and each truck may be loaded evenly. For example, a container truck having a generally elongate container may be positioned under two or three hoppers. If a single 50,000 lb mound of sludge were piled high into only one part of the truck bed, vehicle balance and handling would be adversely effected and sludge could be blown free at highway speeds. Accordingly, loading platforms may be optimally designed with multiple hoppers at each truck loading station to ensure even load-out for each vehicle. The distribution of sludge through each station hopper, regardless of the number, is controlled under precisely the same principle set out above.

In some instances, manual control of load-out may be desirable. The present system contemplates and accommodates such an alternative by providing a position switch 100 wired to the PLC which allows the operator to override the automatic system. The operator can then control the gate position and can terminate the load-out sequence at any time. Under either automatic or manual control, the operator interface panels 76 and 78 provide the operator with information regarding net hopper weights, load out status, and customer information.

When the load-out is completed, the system prints a bill of lading on printer 102. The bill of lading includes truck identification information and load-out weight. The driver checks the accuracy of the information before leaving the load-out station. It may be confirmed by district personnel at an independent truck scale before the truck leaves the plant. In this fashion, accurate records of the transportation and handling of hazardous waste.

FIG. 2 is a side elevation view of a three-bay load-out station 110 in operation. This view shows a sludge transport truck T positioned underneath all three load-out hoppers, 112, 114, and 116, of the station. Immediately above the truck's container C are three load-out metering gates, 118, 120, and 122, in the open position and, in accordance with their design, directing sludge flow F throughout the length of the container for even distribution of load-out. Shut-off gates 124 control fill from the distribution container 126, which is filled from sludge conveyor 128. Finally, FIG. 2 shows that each load-out metering gate has flow control means comprising an actuator 130 operatively connected to respective metering gate blades 132 via an extendable/retractable piston or operating stem 134.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed is:

1. A system for controlling the flow rate at which sludge is out-loaded from hoppers and the rate at which the hoppers are refilled, said system comprising:
    a plurality of hoppers, each having an outlet at its bottom and an inlet at its top, said hoppers for receiving, storing and delivering a volume of sludge load-out;
    a sludge distribution container in communication with a sludge dewatering device of a liquid treatment facility;
    a powered slide gate interposed between each of said hopper inlets and said sludge distribution container, said powered slide gates having a fully opened and a fully closed position and infinite variable positions therebetween;
    hopper refill control means for automatically controlling each of said slide gates and the order in which, and the rate at which, each hopper is refilled after out-loading;
    a sludge metering gate located at the outlet of each of said bottom of said hoppers, said sludge metering gates having a fully opened and a fully closed position and infinite variable positions therebetween;
    load-out flow control means for automatically adjusting the position of said sludge metering gates for controlling the flow of sludge load-out through said sludge gates; and
    a support framework on which said hopper and said sludge gate are mounted.

2. The gravity flow sludge load-out system of claim 1, wherein said hopper refill control means comprises:
    a programmable logic controller (PLC) operatively connected to said slide gates, said PLC including a program for tracking and controlling said hopper refilling.

3. The gravity flow sludge load-out system of claim 2, wherein said PLC program tracks and controls hopper refilling by using hopper net weight status to modulate sludge loading into said hoppers via said slide gates, and wherein said hoppers are filled to a predetermined differential weight as compared to one another, said hopper with the lowest weight being refilled first, and when said hopper's net sludge weight exceeds the predetermined differential weight, as compared to the previous highest hopper weight, the filling sequence is redirected to the new lowest weight hopper, and wherein the refilling cycle continues until all of said hoppers are filled.

4. The gravity flow sludge load-out system of claim 1, wherein said load-out flow control means comprises:
    an actuator for mechanically moving said sludge gate to and from its variable positions;
    an operator interface terminal (OIT) for user input and display of sludge load-out data, wherein said sludge load-out data is selected from the group consisting of sludge batch weight, height level of sludge in said hopper, sludge flow rate, and combinations thereof.

5. The gravity flow sludge load-lout system of claim 4 wherein said load-out flow control means further comprises a programmable logic controller (PLC) operatively connected to said OIT and said actuator.

6. The gravity flow sludge load-out system of claim 5 wherein said load-out flow control means further includes a weigh system for measuring the load-out weight, said weigh system comprising load cells mounted on said support framework below each of said hoppers and electrically connected to said PLC to transmit signals to said PLC, and wherein said PLC continuously monitors the weight of load-out content in said hoppers, continually compares the load-out batch weight to the amount of sludge loaded out through said sludge gates, and selectively adjusts the position of said sludge gates to control the load-out flow rate, and wherein said PLC continuously monitors the sludge weight remaining in said hopper during a load-out operation and systematically decreases the sludge flow rate as the weight of sludge in said hopper approaches a preselected batch load out weight, and continuously calculates the loss in weight per unit time of sludge from said hopper and adjusts the position of said sludge gate to maintain a constant flow rate.

7. The gravity flow sludge load-out system of claim 6, wherein said load-out flow control means further includes sludge height level sensors electrically connected to said PLC to transmit sludge level data to said PLC.

8. The gravity flow sludge load-out system of claim 5, wherein said flow control means includes at least one position sensor located within each of said sludge gates, said position sensors electrically connected to said PLC to transmit signals to said PLC.

9. The gravity flow sludge laod-out system of claim 1, wherein said sludge dewatering device is a centrifuge.

* * * * *